US006921495B2

(12) United States Patent
Jeschke et al.

(10) Patent No.: US 6,921,495 B2
(45) Date of Patent: Jul. 26, 2005

(54) ENVIRONMENTALLY COMPATIBLE DEFROSTING AND ANTIFREEZE AGENTS FOR AEROPLANES

(75) Inventors: Ingo Jeschke, Burgkirchen (DE); Achim Stankowiak, Altoetting (DE); Sabine Frauenhuber, Schalchen (AT); Thomas Wladar, deceased, late of Kastl (DE); by Baerbel Wladar, legal representative, Kastl (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/479,778

(22) PCT Filed: May 22, 2002

(86) PCT No.: PCT/EP02/05584

§ 371 (c)(1),
(2), (4) Date: Jun. 16, 2004

(87) PCT Pub. No.: WO02/099004

PCT Pub. Date: Dec. 12, 2002

(65) Prior Publication Data

US 2004/0211937 A1 Oct. 28, 2004

(30) Foreign Application Priority Data

Jun. 1, 2001 (DE) .......................... 101 27 004

(51) Int. Cl.$^7$ ............................ C09K 3/18; C09K 21/14
(52) U.S. Cl. ......................... 252/70; 106/13; 106/18.26
(58) Field of Search .............................. 106/13, 18.26; 252/70

(56) References Cited

U.S. PATENT DOCUMENTS

| 4,954,279 | A | * | 9/1990 | Ma et al. ....................... 252/70 |
| 4,971,724 | A | | 11/1990 | Kalota et al. ................ 252/390 |
| 5,118,435 | A | | 6/1992 | Nieh ........................... 252/70 |
| 5,268,116 | A | | 12/1993 | Fusiak et al. ................. 252/70 |
| 5,268,117 | A | | 12/1993 | Fusiak et al. ................. 252/70 |
| 5,273,673 | A | | 12/1993 | Ashrawi et al. .............. 252/70 |
| 5,334,323 | A | | 8/1994 | Schrimpf et al. ............. 252/70 |
| 5,386,968 | A | | 2/1995 | Coffey et al. ................. 252/70 |
| 5,750,047 | A | | 5/1998 | Lemma ........................ 252/70 |
| 5,772,912 | A | | 6/1998 | Lockyer et al. ............... 252/70 |
| 5,817,252 | A | | 10/1998 | Hu et al. ...................... 252/70 |
| 5,935,488 | A | | 8/1999 | Wiesenfeld et al. .......... 252/70 |
| 5,942,150 | A | * | 8/1999 | Heuer et al. .................. 252/70 |
| 5,968,407 | A | | 10/1999 | Boluk et al. .................. 252/70 |
| 6,207,079 | B1 | * | 3/2001 | Kmec et al. ............. 252/389.2 |
| 6,287,480 | B1 | * | 9/2001 | Berglund et al. ............. 252/70 |
| 2003/0034478 | A1 | * | 2/2003 | Stanley et al. ................ 252/70 |

FOREIGN PATENT DOCUMENTS

| DE | 40 34 217 | | 5/1991 |
| DE | 195 30 203 | | 2/1997 |
| DE | 019530203 A1 | * | 2/1997 |
| DE | 198 39 569 | | 3/2000 |
| DE | 199 57 316 | | 5/2001 |
| JP | 1-146986 A | * | 6/1989 |
| WO | WO 95/16767 | | 6/1995 |
| WO | WO 02/24841 | | 3/2002 |

OTHER PUBLICATIONS

KILFROST, "Electrochemically Induced Fire Test", Society of Automotive Engineers, 12 pages, Sep. 29, 2000).*
Chemical Abstract for Ogawa, Shinichi, "New Approaches to the Evaluation of Textiles", Sen'i Kogyo Zasshi, Boshokukai, 1973, vol. 64, No. 7, pp 28–31, no month.
Mitsuiki, et al., "Relationship between the Antifreeze Activites and the Chemical Structures of Oligo– and Poly–(glutamic acid)s", J. Agric. Food Chem., 1998, vol. 46, No. 3, pp. 891–895, no month.
Cancilla, et al., "Detection of Aircraft Deicing/Anticing Fluid Additives in a Perched Water Monitoring Well at an International Airport", Environ. Sci. Technol., 1998, vol. 32, pp. 3834–3835, no month.
English abstract for JP 10–183492, Jul. 14, 1998.
English abstract for JP 2000–319532, Nov. 21, 2000.

* cited by examiner

Primary Examiner—Anthony J. Green
(74) Attorney, Agent, or Firm—Richard P. Silverman

(57) ABSTRACT

The invention relates to a deicing or anti-icing composition comprising at least 0.01 to 0.5% wt of at least one alkali metal salt of polyaspartic or polyglutamic acids or a mixture thereof, having a total molecular weight of 5,000 to 50,000 g/mole as a flame retardant. The invention also relates to a method for deicing or preventing the formation of ice on a substrate by applying a composition to the substrate, wherein the composition comprises a flame retardant comprising alkali metal salts of polyaspartic or polyglutamic acids, or a mixture thereof, having a total molecular weight of between 5,000 and 50,000 g/mole, in proportions of 0.01 to 0.5 wt % in relation to the deicing or anti-icing composition. A method of making a deicing or anti-icing composition having a reduced electrochemical activity is also disclosed.

8 Claims, No Drawings

ENVIRONMENTALLY COMPATIBLE DEFROSTING AND ANTIFREEZE AGENTS FOR AEROPLANES

The present invention relates to electrochemically inhibited water/glycol mixtures which are used as deicing and anti-icing compositions. These mixtures serve to remove frozen precipitation such as ice and snow, in particular from surfaces of aircraft, and also to prevent the areas icing up again. During takeoff the intention is that these fluids should run from the surfaces of the aircraft as a result of the shear stresses which occur at takeoff.

During the winter months, surfaces of aircraft can become covered with frozen precipitation. This frozen precipitation must be removed before the aircraft takes off, since it results in severe impairment of the lift which is required for takeoff.

A distinction is made between deicing compositions, which are used predominantly to remove frozen precipitation, and anti-icing compositions, which are intended to counteract re-icing on aircraft surfaces which have already been deiced and are therefore clean. The term "deicing compositions" stands below for both of these types, unless the context makes it clear that a distinction is being made between deicing and anti-icing compositions.

In order to remove frozen precipitation it is usual to use deicing compositions based on water/glycol. The glycol acts as an agent which lowers the freezing point. Also present are surfactants, which lower the surface tension of the deicing composition and thereby improve the wetting of the aircraft surfaces. Deicing compositions further comprise corrosion inhibitors, defoamers, dyes, and flame retardants. Unthickened deicing compositions of this kind are distinguished by a Newtonian rheology. This means that their viscosity is independent of shear. In accordance with the SAE (Society of Automotive Engineering) convention, unthickened deicing compositions of newtonian rheology are referred to as type I fluids. Type I fluids are diluted with varying amounts of water, depending on the external temperature, and are applied hot to the aircraft surfaces using spraying vehicles. They allow frozen deposits to be removed effectively. However, type 1 fluids offer only very limited protection against re-icing.

Unlike deicing compositions, anti-icing compositions additionally comprise thickeners. The viscosity which this gives these fluids enhances the protection against re-icing, since in the state of rest the fluid is very slow to run from the aircraft surface and is therefore able to thaw precipitation freezing over a relatively long period of time. Thickeners give anti-icing compositions a nonnewtonian, pseudoplastic rheology. The viscosity of these fluids is dependent on shear. At the moment of takeoff, the viscosity of the fluid falls very sharply owing to the increasing airflow and the fluid is thus able to run rapidly from the aircraft surfaces. Anti-icing compositions are only applied after the aircraft surfaces have been cleaned of all frozen contaminants. Depending on the icing prevention time a distinction is made between type II, type III, and type IV fluids. Type III fluids are distinguished by a particularly pseudoplastic rheology, and so are used to deice aircraft with a low takeoff speed.

Aircraft deicing compositions are required to satisfy a large number of requirements. According to the SAE specifications AMS (Aerospace Material Standards) 1424 and AMS 1428 an examination is made not only of the runoff and the icing prevention time but also of numerous additional physical properties.

One of these, for example, is the shear stability of aircraft deicing compositions. The fluids are applied by spraying vehicles, producing a high mechanical load on the fluids. During this operation the deicing compositions must not lose more than 20% of their original viscosity. The viscosity of the aircraft deicing compositions must not alter in the course of storage for a prolonged period of time. An aircraft deicing composition must not be corrosive, particularly toward aluminum, magnesium, steel, and acrylic glass. Finally, it must be environmentally compatible and must not support fire. In respect of the two last-mentioned properties there is a need for further development.

U.S. Pat. No. 4,954,279 discloses the microemulsion of an oil in a water/glycol mixture. Thickeners and surfactants are present as well. Since all of the components are in a microemulsion, important fluid properties such as shear stability and storage stability, particularly at very low temperatures, are improved.

The deicing composition disclosed in U.S. Pat. No. 5,118,435 is likewise based on the synergistic effect achieved through the combination of two polyacrylates as thickeners. The viscosity of the fluid is temperature-independent, so that the film thickness of the applied deicing composition is low at any possible external temperature and the fluid, accordingly, always runs off effectively when the aircraft takes off.

U.S. Pat. No. 5,273,673 discloses deicing compositions which obtain distinctly improved holdover times through the use of alkylphenol ethoxylates. According to U.S. Pat. No. 5,386,968 the same class of surfactant leads to an improvement in the holdover time of dilute unthickened aircraft deicing composition.

In U.S. Pat. No. 5,334,323 the neutralization of the polyacrylic acid thickener is carried out using a mixture of NaOH and KOH. As a consequence of this the aircraft deicing composition has a particularly low viscosity and hence runs off effectively.

In accordance with U.S. Pat. No. 5,750,047 success was achieved in significantly increasing the icing prevention time of thickened deicing compositions by virtue of targeted syntheses of crosslinked polyacrylate molecules.

U.S. Pat. No. 5,772,912 discloses environmentally-friendly deicing compositions for a very wide variety of applications, based on xanthan as thickener.

In accordance with U.S. Pat. No. 5,817,252 the combination of two nonionic surfactants differing in HLB is exploited in order to control the diffusion of the freezing precipitation, so that the deicing composition does not ice up until very much later. The same principle has been applied by U.S. Pat. No. 5,835,488 to SAE type II fluids.

U.S. Pat. Nos. 5,118,435, 5,268,116, 5,268,117, 5,273,673, 5,334,323, 5,386,968, 5,750,047, 5,817,252, 5,935,488 and 5,968,407 disclose benzotriazole and tolyltriazole or their alkali metal salts as corrosion inhibitors.

From the abovementioned prior art it is clear that the development of aircraft deicing compositions has to date concentrated almost without exception on improving the holdover time and the runoff. Little has been done to date to make aircraft deicing compositions more environmentally compatible at the same time.

Corrosion inhibitors used in aircraft deicing compositions are predominantly benzotriazole or tolyltriazole, their alkali metal salts or a mixture of these substances. The concentration at which the corrosion inhibitors are used is generally situated within a range between 0.2 and 1.7% by weight. These compounds not only protect the metals used predominantly in aircraft construction against corrosion, but also serve, additionally, for the prevention of fire.

Investigations by General Dynamics (General Dynamics AD-A 008 896, "Chemically induced fires in aircraft electrical circuitry by glycol/water solutions. Hazard analysis and elimination methods", H. D. Stevens, 1975) show that a chemical reaction occurs as soon as one drop of glycol causes a short circuit between two silver-plated copper wires carrying a direct current of 28 volts, as typically occurs in the electrical circuits of aircraft. An exothermic electrolysis reaction is observed, which is accompanied by smoke and flames.

On board an aircraft there are numerous electronic components, leads and connections which unavoidably come into contact with a wide variety of liquids. Externally, aircraft come into contact with water, landing strip deicing compositions, external aircraft cleaning products, and aircraft deicing compositions. All of the electrical components in an aircraft are protected by insulation. Nevertheless, it is impossible to avoid insulation deteriorating as a result of age, so that electronic components can come into direct contact with the substances referred to above. Aircraft deicing compositions contain glycols, which in such situations can easily ignite as the result of exothermic electrolysis reactions. During the electrolysis, hydrogen is formed at the cathode, while at the anode an oxidation takes place. The intensity of the electrolysis reaction is influenced not only by the size of the electrodes and the distance between them but also by the liquid volume, temperature, and composition of the glycol/water mixture. In the case of the silver-plated wires typically used in aircraft construction, silver oxide is formed at the anode during the electrolysis reaction. The silver oxide catalyzes dehydrogenation of the glycol. The hydrogen formed at the cathode can, finally, ignite as a result of the heat given off during the electrolysis.

General Dynamics investigated various substances which as additives to glycol/water mixtures are able to inhibit exothermic electrolysis reactions. In the course of those investigations it was found that benzotriazole and tolyltriazole, and their alkali metal salts, were the most suitable. The mechanism of inhibitory action is not precisely known. The triazole molecules apparently attach to the surface of the silver and so prevent any subsequent electrolysis reaction.

In accordance with these investigations carried out by General Dynamics, benzotriazole or tolyltriazole or their alkali metal salts have been used as flame retardants in all aircraft deicing compositions for thirty years, for the purpose of suppressing exothermic electrolysis reactions. These flame retardant substances are classed as being of low toxicity. (Tolyltriazole: LD50 oral rat: 675 mg/kg, LCO in Brachydanio rerio: 42.2 mg/l; benzotriazole LD50 oral rat: 560 mg/kg, LQ in Brachydanio rerio: 100 mg/l). The biodegradability of both substances is very small.

Generally speaking, aircraft deicing compositions are used only on areas envisaged for the purpose, so that a large quantity of the fluid running off in droplets can be supplied in a controlled fashion to the treatment plants. Nevertheless it is possible to avoid a fraction of the fluid running off from the aircraft surfaces onto green areas in the course of taxiing and during takeoff. Owing to the poor degradability of these additives, there may be an accumulation of triazoles in the soil and groundwater in the vicinity of airports. For example, high concentrations of tolyltriazole have been detected in the groundwater of the airport at Milwaukee, Wis. (Environmental Science & Technology, vol. 32, p. 3834).

The object of the invention, accordingly, is to find an additive which reduces the electrochemical activity and at the same time is readily degradable and nontoxic.

Surprisingly it has been found that deicing compositions and anti-icing compositions which in addition to the familiar constituents of such fluids, such as glycols, thickeners, surfactants, and corrosion preventatives, for example, at the same time comprise a substance which inhibits electrochemical activity of the fluids and is based on alkali metal salts of polyaspartic acid or of polyglutamic acid and also on a mixture of these two substances achieve the stated object. The compounds in question are water-soluble, nontoxic and very effectively biodegradable compounds which were hitherto unknown for improving the fluid properties of aircraft deicing compositions.

The invention accordingly provides a deicing or anti-icing composition based on glycols and water that contains from 0.01 to 1% by weight of at least one alkali metal salt of polyaspartic acid or of polyglutamic acid or of a mixture thereof and has a molecular weight of from 5000 to 50,000 g/mol.

The invention further provides for the use of alkali metal salts of polyglutamic acid, polyaspartic acid or mixtures thereof, having molecular weights of from 5000 to 50,000 g/mol, in amounts of from 0.01 to 1% by weight, based on the deicing or anti-icing composition, as a flame retardant in deicing or anti-icing compositions.

The invention additionally provides a method of deicing or of protecting against icing which comprises applying to the object to be deiced a deicing composition comprising alkali metal salts of polyglutamic acid, polyaspartic acid or mixtures thereof, having molecular weights of from 5000 to 50,000 g/mol, in amounts of from 0.01 to 1% by weight, based on the deicing or anti-icing composition. The method can be employed with particular advantage for aircraft.

The amount of polyglutamic/polyaspartic salt in the deicing or anti-icing compositions of the invention is preferably from 0.02 to 0.5% by weight. The molecular weights of the polyacids are preferably from 8000 to 20,000 g/mol.

The deicing or anti-icing compositions of the invention can be type I, II, III or IV deicing compositions. Their constitution is described below, with the polyglutamic/polyaspartic salts being an additional component in each case.

A type I deicing or anti-icing composition of the invention contains preferably from 60 to 97% by weight, in particular from 80 to 95% by weight, of at least one glycol selected from the group consisting of alkylene glycols having 2 or 3 carbon atoms and oxalkylene glycols having 4 to 6 carbon atoms.

A type I deicing or anti-icing composition of the invention further contains preferably from 0.01 to 1% by weight, more preferably 0.02 to 0.5% by weight, of at least one anionic or nonionic surfactant.

The type I deicing or anti-icing compositions of the invention generally contain water as the remainder, to 100% by weight.

Type II, III or IV deicing or anti-icing compositions of the invention, based on glycols and water, contain preferably from 20 to 70% by weight, in particular 40–60% by weight, of at least one glycol selected from the group consisting of alkylene glycols having 2 or 3 carbon atoms and oxalkylene glycols having 4 to 6 carbon atoms.

Type II, III or IV deicing or anti-icing compositions of the invention further contain preferably from 0.01 to 2% by weight, in particular 0.03 to 1.8% by weight, of a water-soluble thickener.

Type II, III or IV deicing or anti-icing compositions of the invention further contain preferably from 0.01 to 1% by weight, in particular 0.02 to 0.5% by weight, of at least one anionic or nonionic surfactant.

Type II, III or IV deicing or anti-icing compositions of the invention generally contain water as the remainder, to 100% by weight.

Amounts in percent by weight are based on the weight of the composition.

The deicing compositions of the invention contain preferably from 20 to 97% by weight of glycols. The glycol constituents of the deicing compositions of the invention are preferably ethylene glycol, propylene glycol (1,2-propylene glycol or 1,3-propylene glycol), diethylene glycol, dipropylene glycol or a mixture of two or more of these glycols, particular preference being given to propylene glycols. The primary purpose of the glycols is to lower the freezing point, and besides water they constitute the major component of the fluid.

The thickeners are soluble in water. Preference is given to using crosslinked homopolymers or copolymers of unsaturated carboxylic acids such as acrylic acid, methacrylic acid and their derivatives such as esters and amides, and also cellulose ethers (alkyl-, hydroxyalkyl-, and carboxyalkyl-cellulose ethers), xanthan gum and the like or mixtures of such water-soluble polymers. The nonionic surfactant constituents of the deicing compositions of the invention are preferably alkoxylated fatty alcohols having 6 to 24 carbon atoms in the alkyl radical, preferably 8 to 18 carbon atoms, alkoxylated with from 1 to 10 molecules, preferably from 1 to 8 molecules, of at least one $C_2$ to $C_4$ alkylene oxide. The alkylene oxide is preferably ethylene oxide, propylene oxide or a mixture thereof, preference being given to ethylene oxide. The alkyl radical in the fatty alcohol can be straight-chain or branched, aliphatic or aromatic, saturated or unsaturated, with preferably from 1 to 3 double bonds. Further classes of compounds suitable as nonionic surfactants are the ethylene oxide-propylene oxide block polymers, fatty acid polyglycol esters, and alkylphenol alkoxylates. Examples that may be mentioned include the following: octyl, decyl, dodecyl, isotridecyl, para-iso-nonylphenyl, para-iso-octylphenyl, and stearyl alcohol, and also oleyl alcohol, cocoalkyl alcohol, and tallow alkyl alcohol. The surfactant constituent can also be a mixture of the stated fatty alcohols and/or fatty alcohol alkoxylates: for example, a fatty alcohol mixture with a $C_{12}$ and $C_{14}$ alkyl radical ($C_{12}/C_{14}$ fatty alcohol).

The anionic surfactant constituents of the deicing compositions of the invention are preferably selected from the group consisting of alkylsulfonates, olefin sulfonates, alkyl ether sulfates, alkyl sulfates, alkylaryl ether sulfates, polyglycol ether sulfates, alkylpolyglycol ether phosphates, and alkylaryl polyglycol ether phosphates. Alkyl is preferably $C_6$ to $C_{22}$ alkyl; aryl is preferably $C_6$ to $C_{12}$ aryl.

In the deicing compositions of the invention it is additionally possible to use corrosion inhibitors, as customary for fluids based on glycols and water. Examples of suitable corrosion inhibitors include alkali metal phosphates or lower alkyl phosphates such as ethyl phosphate, dimethyl phosphate or isopropyl phosphate. It is also possible to use thiourea, sodium nitrate or butyne-1,4-diol.

The deicing compositions may further comprise defoamers, dyes, complexing agents, and antioxidants.

The pH of SAE deicing fluids is to be from 6.5 to 10, preferably from 7 to 9. Where the fluid of the invention does not already have such a pH, it can simply be set by means of suitable pH regulators. Generally a basic compound is added to the fluid. Suitable basic compounds are those from the group consisting of alkali metal hydroxides such as NaOH and KOH, alkylamines such as butylamine, hexylamine, octylamine, and isononylamine, and alkanolamines such as mono-, di-, and triethanolamine. The alkali metal hydroxides are preferred.

The deicing composition and anti-icing composition of the invention is prepared by mixing the individual components together in any order, an operation which can be carried out, for example, in a vessel equipped with stirrer.

The invention is now illustrated by means of examples.

First of all an apparatus was constructed to allow assessment of the flame retardancy. Instead of silver-coated copper wire electrodes a printed circuit board is used. The advantage of the printed circuit board is its defined geometry, which ensures high reproducibility of the test results. The conductor tracks are manufactured of copper and are subsequently silver plated. The length of the conductor tracks is 10 mm, their width is 1 mm, and the distance between two tracks is likewise 1 mm. The printed circuit board is connected using crocodile clips to a 28 V direct current source. To observe the flow of current between both conductor tracks, a meter for recording the current strength is additionally built into the circuit.

To investigate the flame retardancy of additives, the printed circuit board is immersed in a 50 ml solution of the glycol/water mixture and the current source is switched on. The solution is to have a temperature of 20° C. A low electrochemical activity is indicated by the current strength not exceeding a level of 25 mA within the first 15 minutes. This means that the flow of current between the two conductor tracks is too low to initiate an electrolysis reaction, with the consequence that there is no exothermic reaction and hence it is impossible for any ignition of the glycol/water mixture to occur.

EXAMPLE 1

An inventive SAE type I deicing composition is prepared by mixing the following components (concentrate):

| | |
|---|---|
| 80.00% by weight | 1,2-propylene glycol |
| 0.20% by weight | $C_{12}/C_{14}$ fatty alcohol ethoxylated with 5 mol of ethylene oxide |
| 0.10% by weight | alkali metal polyaspartate with 10,000 g/mol |
| 19.7% by weight | water |

The apparatus described above for determining the electrochemical activity of glycol/water mixtures is first of all tested using two reference fluids.

For this purpose a reference fluid 1 is prepared, consisting of 25% by weight 1,2-propylene glycol, 0.15% by weight benzotriazole and 74.85% by weight standard hard water (composition as specified in AMS 1424). Reference fluid 1 shows a low electrochemical activity within 15 minutes during the test run. The current strength recorded is always below 25 mA.

Reference fluid 2 consists of 25% by weight 1,2-propylene glycol and 75% by weight standard hard water. It shows a high electrochemical activity. The current strength is between 25 mA and 75 mA throughout the test run. Additionally, the formation of hydrogen at the cathode is substantial.

The deicing composition of Example 1 is diluted with standard hard water so that the glycol content is likewise 25% by weight. During the test run only a very low electrochemical activity, below 25 mA, is measured. No electrolysis reaction is observed.

Further investigations on the aircraft deicing composition described under. Example 1 show that it meets all of the other requirements of the SAE Specification AMS 1424. Thus the icing prevention time (WSET test) both of the concentrate and of the 1:1 dilution with water is greater than 3 minutes. The runoff of all of the test concentrations in a wind tunnel corresponds to the minimum requirement at all required temperatures. Additionally, all of the material tests are complied with.

EXAMPLE 2

An inventive SAE type I deicing composition is prepared by mixing the following components (concentrate):

| | |
|---|---|
| 90.00% by weight | ethylene glycol |
| 0.15% by weight | $C_{13}$ fatty alcohol ethoxylated with 10 mol of ethylene oxide |
| 0.20% by weight | alkali metal polyglutamate with 20,000 g/mol |
| 9.625% by weight | water |

The deicing composition of Example 2 is diluted with standard hard water so that the glycol content is likewise 25% by weight. During the test run only a very low electrochemical activity, below 25 mA, is measured. No electrolysis reaction is observed.

Further investigations on the aircraft deicing composition described under Example 2 show that it meets all of the other requirements of the SAE Specification AMS 1424. Thus the icing prevention time (WSET test) both of the concentrate and of the 1:1 dilution with water is greater than 3 minutes. The runoff of all of the test concentrations in a wind tunnel corresponds to the minimum requirement at all required temperatures. Additionally, all of the material tests are complied with.

EXAMPLE 3

An inventive SAE type IV deicing composition is prepared by mixing the following components (concentrate):

| | |
|---|---|
| 50.00% by weight | 1,2-propylene glycol |
| 0.25% by weight | crosslinked polyacrylic acid |
| 0.15% by weight | $C_{14}$ fatty alcohol ethoxylated with 8 mol of ethylene oxide |
| 0.50% by weight | alkali metal polyaspartate with 5,000 g/mol |
| 0.073% by weight | sodium hydroxide |
| 0.073% by weight | potassium hydroxide |
| 48.954% by weight | water |

The deicing composition of Example 3 is diluted with standard hard water so that the glycol content is likewise 25% by weight. During the test run only a very low electrochemical activity, below 25 mA, is measured. No electrolysis reaction is observed.

Further investigations on the aircraft deicing composition described under Example 3 show that it meets all of the other requirements of the SAE Specification AMS 1424. Thus the icing prevention time (WSET test) of the concentrate is greater than 80 minutes. The 1:1 dilution with water has a holdover time of more than 5 minutes. The runoff of all of the test concentrations in a wind tunnel corresponds to the minimum requirement at all required temperatures. Additionally, all of the material tests are complied with.

EXAMPLE 4

An inventive SAE type IV deicing composition is prepared by mixing the following components (concentrate):

| | |
|---|---|
| 50.00% by weight | 1,2-propylene glycol |
| 0.33% by weight | crosslinked polyacrylic acid |
| 0.12% by weight | $C_{12}/C_{16}$ fatty alcohol ethoxylated with 6 mol of ethylene oxide |
| 0.50% by weight | alkali metal polyglutamate with 35,000 g/mol |
| 0.18% by weight | sodium hydroxide |
| 48.87% by weight | water |

The deicing composition of Example 4 is diluted with standard hard water so that the glycol content is likewise 25% by weight. During the test run only a very low electrochemical activity, below 25 mA, is measured. No electrolysis reaction is observed.

Further investigations on the aircraft deicing composition described under Example 4 show that it meets all of the other requirements of the SAE Specification AMS 1424. Thus the icing prevention time (WSET test) of the concentrate is greater than 80 minutes. The 1:1 dilution with water has a holdover time of more than 5 minutes. The runoff of all of the test concentrations in a wind tunnel corresponds to the minimum requirement at all required temperatures. Additionally, all of the material tests are complied with.

What is claimed is:

1. A method for deicing or preventing the formation of ice on a substrate comprising the step of applying a composition to the substrate, wherein the composition comprises a flame retardant, wherein the flame retardant is an alkali metal salt of polyglutamic acid, polyaspartic acid or mixtures thereof, with a molecular weight of from 5000 to 50,000 g/mol, and wherein the flame retardant is present in an amount of from 0.01 to 0.5% by weight, based on the composition.

2. The method as claimed in claim 1, wherein the flame retardant is present in an amount from 0.02 to 0.5% by weight, based on the weight of the composition.

3. The method as claimed in claim 1, wherein the molecular weight of the flame retardant is from 8000 to 20,000 g/mol.

4. The method as claimed claim 1, wherein the composition further comprises at least one glycol present in an amount of from 20 to 97% by weight, wherein the at least one glycol is selected from the group consisting of ethylene glycol, 1,2-propylene glycol, 1,3-propylene glycol, diethylene glycol, dipropylene glycol and mixtures thereof.

5. The method as claimed in claim 1, wherein the composition further comprises from 0.01 to 1% by weight of at least one anionic and/or nonionic surfactant.

6. A deicing or anti-icing composition comprising a flame retardant, wherein the flame retardant is an alkali metal salt of polyglutamic acid, polyaspartic acid or mixtures thereof, with a molecular weight of from 5000 to 50,000 g/mol, and wherein the flame retardant is present in an amount of from 0.01 to 0.5% by weight, based on the composition.

7. A method of making a deicing or anti-icing composition having a reduced electrochemical activity, said method comprising the step of adding a flame retardant to the composition, wherein the flame retardant is an alkali metal salt of polyglutamic acid, polyaspartic acid or mixtures thereof, with a molecular weight of from 5000 to 50,000 g/mol, and where in the flame retardant is present in an amount of from 0.01 to 0.5% by weight, based on the composition.

8. The method of claim 7, wherein the amount of flame retardant added provides an electrochemical activity of less than 25 mA as measured at 20° C. between 2 silver-coated copper conductors carrying a direct current of 28 volts.

* * * * *